United States Patent
Ives (10) Patent No.: US 6,618,254 B2
(45) Date of Patent: Sep. 9, 2003

(54) METHODS AND APPARATUS FOR SECURING DISK DRIVES IN A DISK ARRAY

(75) Inventor: Thomas W Ives, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/946,252

(22) Filed: Sep. 5, 2001

(65) Prior Publication Data

US 2003/0043550 A1 Mar. 6, 2003

(51) Int. Cl.[7] ................................................ H05K 5/00
(52) U.S. Cl. ..................... 361/726; 361/801; 360/97.01; 174/52.1
(58) Field of Search ................................ 361/726, 725, 361/727, 801; 360/137, 97.01, 98.01; 364/78.1; 312/223.1–223.2; 174/52.1

(56) References Cited

U.S. PATENT DOCUMENTS

| | | | |
|---|---|---|---|
| 5,212,681 A | | 5/1993 | Bock et al. |
| 5,533,631 A | * | 7/1996 | Marchetti ............... 361/801 |
| 5,566,049 A | | 10/1996 | Nguyen |
| 5,825,627 A | * | 10/1998 | Tamura .................. 361/730 |
| 6,272,573 B1 | * | 8/2001 | Coale et al. ............ 710/100 |
| 6,285,545 B1 | * | 9/2001 | Lopez .................... 361/683 |
| 6,318,679 B1 | * | 11/2001 | Yang et al. ............ 248/201 |
| 6,323,423 B1 | * | 11/2001 | Tirrell et al. .......... 361/683 |
| 6,349,031 B1 | * | 2/2002 | Lin et al. ............... 361/685 |
| 6,442,021 B1 | | 8/2002 | Bolognia et al. |

FOREIGN PATENT DOCUMENTS

| | | |
|---|---|---|
| EP | 0132152 A2 | 1/1985 |
| EP | 0560529 A2 | 9/1993 |
| EP | 0589708 A2 | 3/1994 |
| EP | 0843313 A1 | 5/1998 |
| GB | 2335799 A | 9/1999 |
| JP | 090330587 A | 12/1997 |
| WO | WO01/93270 A2 | 12/2001 |

OTHER PUBLICATIONS http://www.33comix.com/hefs/ms1620.html, MS–1620 16/20 Bay Vertical File Server Enclosure, Printout Dated Feb. 19, 2003.

* cited by examiner

Primary Examiner—Darren Schuberg
Assistant Examiner—Hung Van Duong (57) ABSTRACT

A disk array system includes a plurality of disk drives rigidly connected to one another. The disk array system can also include a cage defining openings configured to receive the disk drives individually therein. In this configuration the disk array system can further include a locking system for rigidly securing individual disk drives into the openings in the cage to thereby rigidly connect the disk drives to one another. In an alternate configuration, the disk array system can have a chassis configured to support the plurality of disk drives. The disk drives can then be rigidly connected to one another using a connecting member rigidly connected to the disk drives. In this arrangement the disk array system can also include a frame configured to support the chassis. A chassis-connecting member can then be used to rigidly connect the chassis and the frame.

20 Claims, 11 Drawing Sheets

METHODS AND APPARATUS FOR SECURING DISK DRIVES IN A DISK ARRAY

FIELD OF THE INVENTION

The invention claimed and disclosed herein pertains to disk array systems and apparatus for supporting disk drives in a disk array system, and particularly to methods and apparatus to reduce the effects of shock and vibration on disk drives in a disk array system.

BACKGROUND OF THE INVENTION

Figure 1:
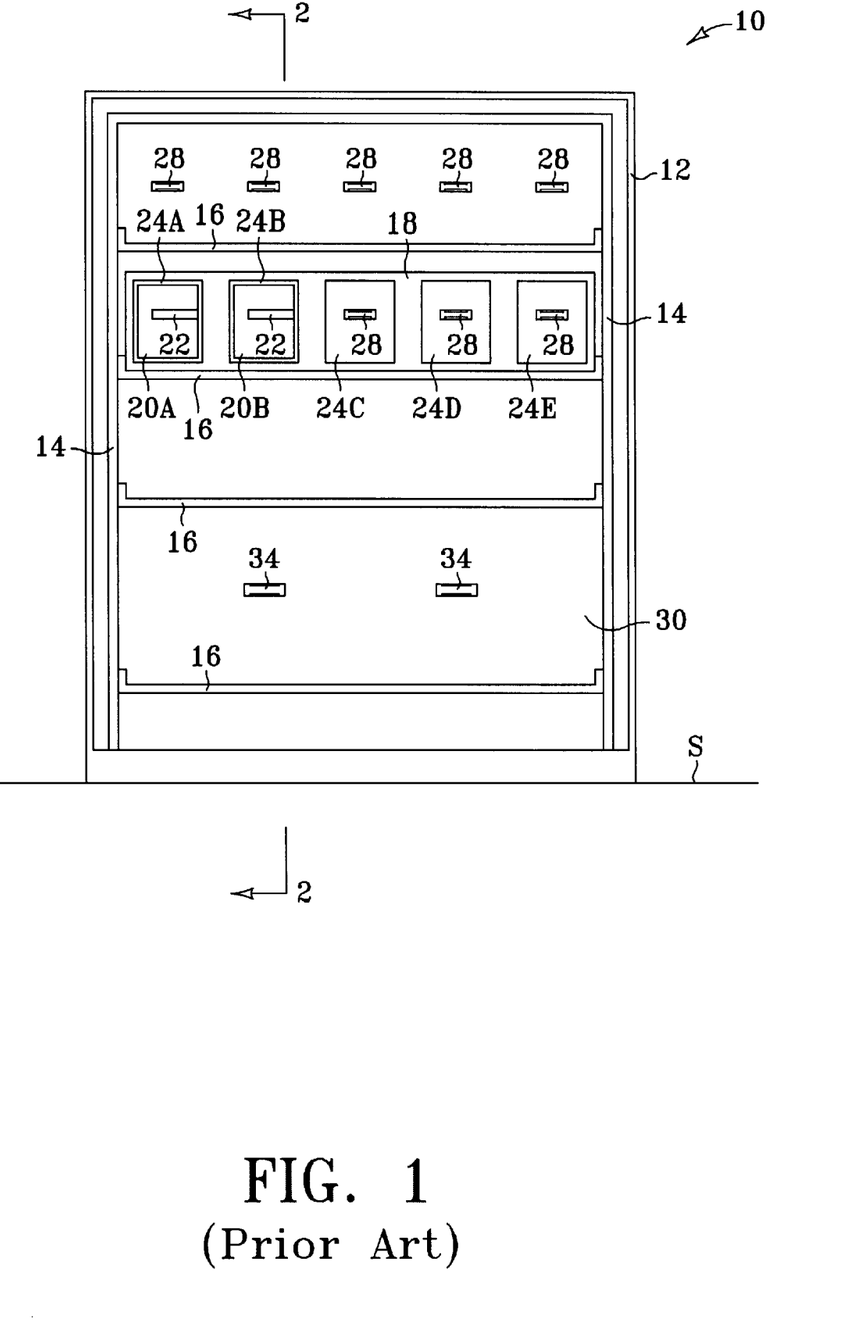
FIG. 1 depicts a front elevation view of a prior art disk array system.

Disk array systems include several (typically 10–30) disk drives, which are supported in a support apparatus. The support apparatus also supports components, which service the disk arrays. Such support components can include power supplies, cooling fans, and data controllers to control the flow of data to and from the disk drives. FIG. 1 depicts a front elevation view of typical prior art disk array system 10. The disk array system includes an outer enclosure 12, which is supported on a surface "S" (such as a floor or the like). The outer enclosure 12 serves as a general protective enclosure to protect the other components of the disk array, and also acts to seal the disk array system to improve the flow of cooling air circulating within the enclosure 12. The outer enclosure 12 also includes a front door panel, which is not shown in this view to facilitate the viewing of the other components of the disk array system 10.

Located within the outer enclosure 12 of the disk array system 10 is a support frame 14, which is commonly fabricated from metal angle sections and the like. The support frame 14 includes trays 16. Each tray 16 serves to support a chassis, only one of which is shown as chassis 18. The chassis 18 defines a plurality of openings 24A, 24B, 24C, 24D and 24E. Each opening 24A–E is configured to receive an operational component of the disk array system 10. In the example depicted, openings 24A and 24B are depicted as receiving respective disk drives 20A and 20B. The disk drives can be secured within the chassis openings using latches 22 or the like. Located behind the trays 16 is a back plane 30 which includes electrical connectors 28 and 34, allowing the functional components to be put into signal and electrical communication with other functional components within the disk array system 10.

Figure 2:
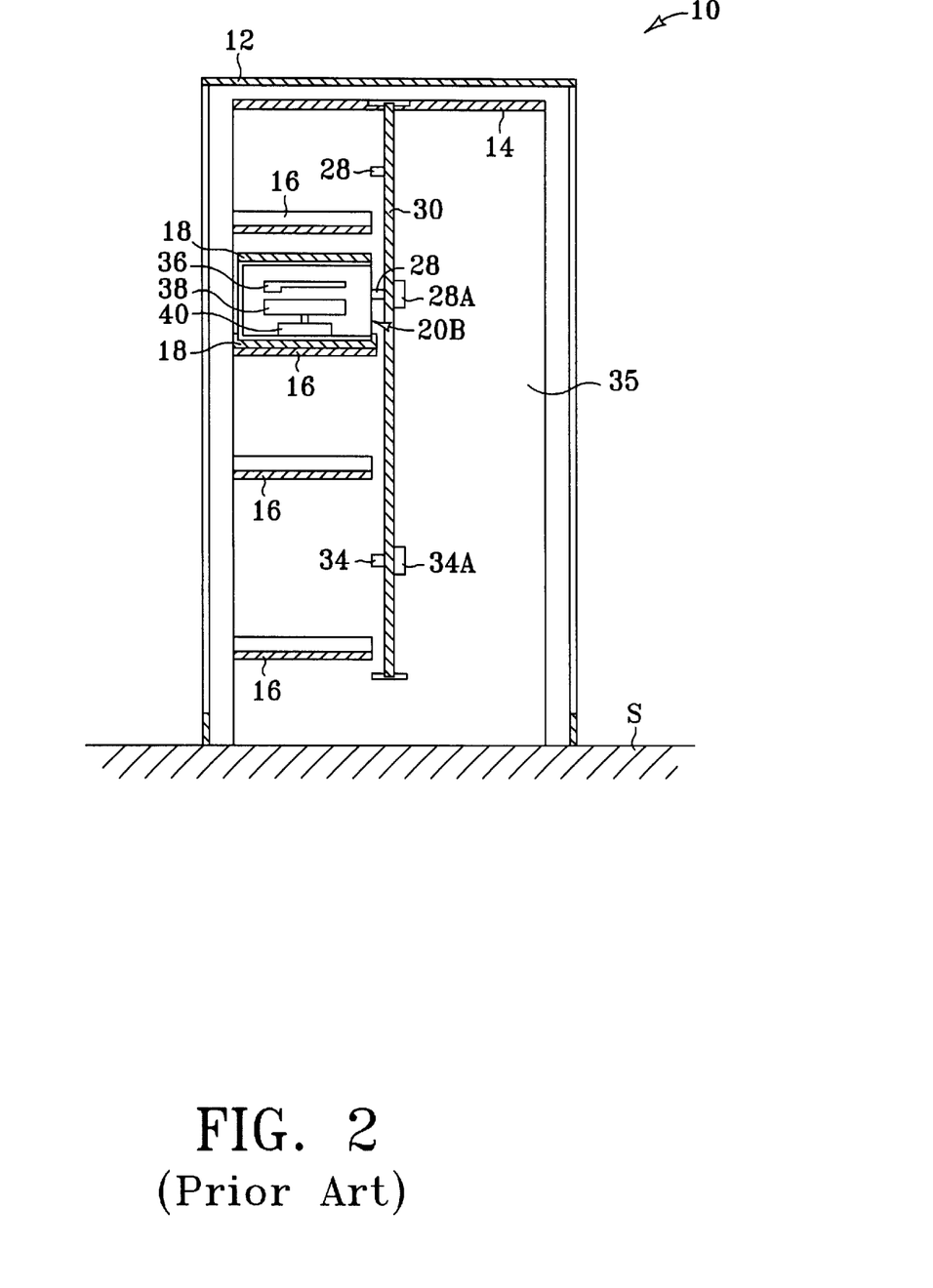
FIG. 2 depicts a side elevation sectional view of the prior art disk array system of FIG. 1.

Turning to FIG. 2, the prior art disk array system 10 of FIG. 1 is depicted in a side elevation sectional view. As can be seen, the back plane 30 allows the disk drive 20A to be connected to the electrical connector 28. The back plane 30 can further include connectors 28A and 34A, allowing flexible cables (not shown) to be used to interconnect the various functional components of the disk array system 10. As can be seen in this view, the disk drive 20A includes a data storage disk section 38 which can be accessed by a read-write head (not shown) which is supported on disk arm 36, allowing data to be transferred to and from the disk section 38.

A common problem encountered with disk array systems is that of shock and vibration, which can affect the performance of individual disk drives with a disk array system. For example, when a disk drive receives a mechanical force in the way of a shock or vibration, the disk arm 36 and the disk section 38 (FIG. 2) can be temporarily misaligned. This can result in a data read/write error, requiring the disk array system to re-read or rewrite the data sector affected by the misalignment. This in turn affects the operational efficiency of the disk array system, resulting in slower data access times. In severe cases mechanical shock and vibration to the disk drive can cause physical damage to the disk drive, requiring that the disk drive be removed for servicing or replacement.

The sources of mechanical shock and vibration which can affect a disk drive originate from three primary sources. The first source is forces external to the disk array system. These can include shock or vibration transmitted through the surface upon which the disk array system is mounted (such as surface "S" in FIG. 1), and can result from earthquakes and even persons walking on the surface. Another source of external shock is via the external housing (12 of FIG. 1), as for example when a person bumps against the housing. The second source of mechanical shock and vibration is from self-excitation. That is, since the disk section (38 of FIG. 2) rotates essentially continuously at a very high speed, a natural frequency inherent to the disk drive itself results. Depending upon the mass of the disk drive and the manner in which the disk drive is supported within the chassis (18 of FIG. 1), these self-excitation forces may be resonant, which can cause severe operational problems with the disk drive. The third primary source of mechanical shock and vibration, which can be imparted to a disk drive, is random excitation, which can be transmitted to the disk drive from other functional components within the disk array system, such as other disk drives and cooling fans. The most common source of this excitation is movement of the arms that support the read/write heads inside the hard disk drives.

Figure 3A:
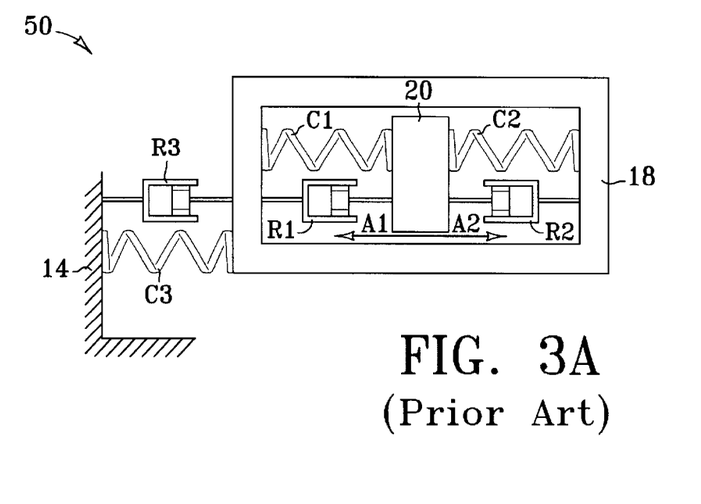
FIGS. 3A and 3B depict the effects of shock and vibration on a disk drive within a prior art disk array system.
Figure 3B:
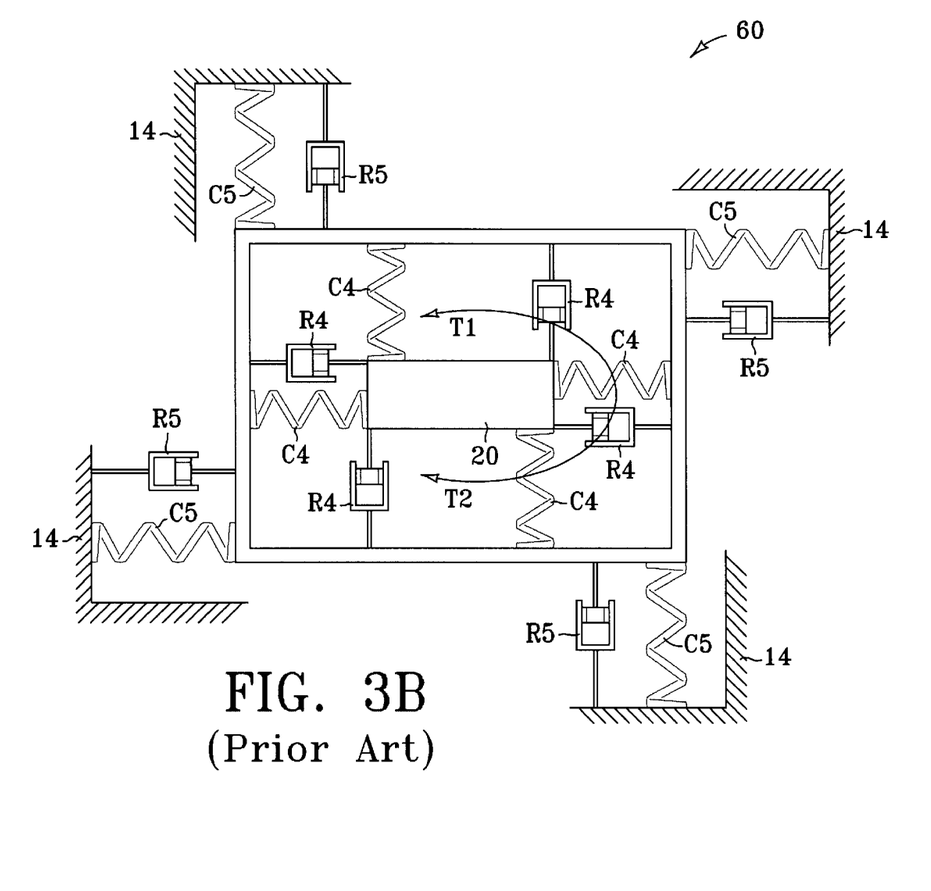

Turning to FIGS. 3A and 3B, schematic diagrams depict how sources of shock and vibration can affect a disk drive in a disk array system. FIG. 3A depicts the translational effects that shock and vibration can have on a disk drive 20 mounted within a chassis 18, which is in turn supported by a frame 14. Shock and vibration can cause the disk drive to move in directions A1 and A2, which can be in any of the X, Y or Z directions. Self-excitation of the disk drive 20 can be dampened by resistive elements R1 and R2 interposed between the disk drive 20 and the chassis 18, but can be compounded by compliant elements C1 and C2. Likewise, random excitation forces imparted to the chassis 18 can be filtered by resistive elements R1 and R2, but can be amplified by compliant elements C1 and C2. External sources of shock and vibration imparted to the frame 14 can be attenuated by resistive element R3 interposed between the frame 14 and the chassis 18, but again can be amplified in a resonant setting by compliant element C3.

Turning to FIG. 3B, a second effect of shock and vibration on the disk drive 20 is depicted. In this figure the effects are not translational movement, but rotational movement of the disk drive 20 in directions T1 and T2, which can be about any of the three rotational (X, Y or Y) axes. Likewise, the chassis 18 can also experience such rotational movement as the result of the various sources of shock and vibration. As with the translational forces depicted in FIG. 3A, the self-excitation forces of the disk drive 20 of FIG. 3B which tend to produce rotational movement of the disk drive 20 can be resisted by resistive elements R4, but can also be amplified in a resonant setting by compliant elements C4. Likewise, random excitation forces, as well as external forces, can cause rotational movement of the chassis 18, which can be attenuated by resistive elements R5, but potentially amplified by compliant elements C5. In certain settings, the compliant elements C4 and C5 can act together to set up a resonance, resulting in severe translational and rotational movement of the disk drive 20, as well as the chassis 18.

The resistive elements R1–R5 of FIGS. 3A and 3B can be, for example, a sheet of rubber material placed between the disk drive 20 and the chassis 18, or between the chassis and the frame 14. The compliant elements C1–C4 of FIGS. 3A and 3B can be, for example, rubberized or otherwise elastically deformable components disposed between the disk drive 20 and the chassis 18, and between the chassis and the frame 14. Such elastically deformable components can also include resistive characteristics, and can thus provide both compliant and resistive (i.e., dampening) characteristics. As one example of a compliant element, it is a common practice to dispose a deformable spring steel leaf spring between the chassis 14 and a disk drive 20 to allow the disk drive to be held in a relatively fixed position with respect to the chassis, while also allowing the disk drive to be easily removed from the chassis for service or replacement. Such a leaf spring is primarily a compliant component, although it also has certain internal resistance to deformation.

One prior art solution to the problem of shock and vibration on a disk drive in a disk array system is to isolate each disk drive in the system by placing a rubber material between the disk drive and the chassis. While this is of some help in isolating the individual disk drive from forces external to the disk array system, as well as random excitation forces, it does nothing to alleviate the effects of self-excitation. In fact, mounting the disk drive in such a manner can contribute to reduced performance, since the disk drive will be somewhat free to move with respect to the chassis as a result of the self excitation forces. In order to reduce self-excitation of disk drives, manufacturers of such devices can manufacture the disk drives to exacting specifications, using very close tolerances and precisely balanced components to reduce self-excitation of the disk drive. However, such manufacturing techniques generally tend to increase the cost of disk drives.

What is needed then is a disk array system, and a method of providing a disk array system, which attenuates the effects of shock and vibration on disk drives within the system, yet avoids the shortcomings and detriments associated with prior art methods and/or devices.

SUMMARY OF THE INVENTION

The present invention provides methods and apparatus to reduce vibration, and the effects thereof, in disk drives in a disk array system. In one embodiment, disk drives in a disk array system are rigidly connected to one another such that the effective inertial mass of each disk drive now becomes the total or collective inertial mass of all disk drives rigidly connected to one another within the disk array. The increase in the effective inertial mass of each disk drive helps attenuate the resulting movement of each disk drive as a result of general external forces, internal forces resulting from resonant self-excitation (e.g., the spinning of the disk), and internal forces resulting from random self-excitation (e.g., the movement of the read-write arm). Further, by rigidly connecting disk drives to one another within the disk array, the effects of self-excitation of each disk drive tend to be attenuated by or reduced by the effects of self-excitation of the other disk drives, which are rigidly connected to one another. In one variation of the present invention disk drives within a disk array are directly connected to one another in a rigid manner such that the collective (effective) inertial mass of each disk drive becomes the collective inertial mass of all disk drives thus connected. In another variation of the present invention the disk drives are individually rigidly connected to a cage (and thus effectively to one-another), such that the effective inertial mass of each disk drive becomes the collective inertial mass of all disk drives connected to the cage, as well as the inertial mass of the cage itself. Further, the disk drives can be rigidly connected to prior art components of a disk array (such as a chassis and/or a frame used to support the disk drives in the disk array), in which case the effective inertial mass of each disk drive becomes the collective inertial mass of all disk drives connected to the component(s) of the disk array, as well as the inertial mass of such components.

These and other aspects and embodiments of the present invention will now be described in detail with reference to the accompanying drawings, wherein:

DETAILED DESCRIPTION OF THE INVENTION

The present invention provides methods and apparatus to reduce the effects of external mechanical shock, system-induced random excitation, self-induced random excitation, and resonant self-excitation on disk drives in a disk array system. I will use the expression "self-excitation" to mean both self-induced random excitation, and resonant self-excitation. In the present invention, two or more disk drives in a disk array system are rigidly connected or secured to one another. This results in two beneficial effects: first, the effective inertial mass of each disk drive so connected becomes equal to the collective inertial mass of all the disk drives so connected, and second, the self-excitation forces of rigidly connected disk drives generally tend to cancel out one another, resulting in reduced self-excited vibration of the connected disk drives. The disk drives can be rigidly connected directly to one another, or they can be rigidly connected to one another via an intermediate apparatus, such as a specially formed cage configured to rigidly support a plurality of disk drives therein.

In the following discussion I refer to "rigidly connecting" or "rigidly connected" disk drives. By this expression I mean that a disk drive so connected to another immediately adjacent disk drive (either directly or through an intermediate apparatus) is constrained to move translationally with respect to the other disk drive by not more than about 500 microns, and preferably by not more than about 100 microns, when measured at their nearest point or point of contact, and when subjected to a force of not more than about 10 kg, and preferably a force of not more than about 5 kg. Further, by "rigidly connected" disk drives I mean that a disk drive so connected to another immediately adjacent disk drive (either directly or through an intermediate apparatus) is constrained to move rotationally with respect to the other disk drive by not more than about 3 degrees, and preferably by not more than about 1.5 degrees, when subjected to a torsional force of not more than about 1 kilogram force meter (kfm).

Preferably the disk drives are rigidly connected to one another such that they can be disconnected for removal, such as for servicing or replacement. In this preferable configuration, the disk drives will be able to move beyond the suggested limits of movement just described. However, in order to achieve such movement either the suggested forces are exceeded, or a mechanical connecting system, such as a locking system or a securing member, must first be disabled to thereby allow the disk drives to be disconnected from one another. Accordingly, it is understood that the expression "rigidly connected" refers to limited movement when the disk drives are in an intended connected condition, and when the forces acting on any one of the connected disk drives does not exceed anticipated shock and vibration forces. Of course, an extreme impact to a disk array, such as by dropping it, or extreme vibration which can be induced, for example, by a failed bearing in a disk drive, can result in forces which cause "rigidly connected" disk drives to move beyond the suggested limits of movement. However, these situations are not the anticipated shock and vibration events, which are intended to be addressed by the present invention.

In a first embodiment of the present invention disk drives are rigidly secured in a structure (hereafter, a "cage") to thereby rigidly connect the disk drives to one another. In addition to holding the disk drives in a rigid position with respect to one another, the cage also increases the effective inertial mass of each disk drive secured in the cage. Accordingly, the effects of shock and vibration on each disk drive will be attenuated. That is, following the basic formula for acceleration "a" of a body having a mass "m" under a force "F", a=F/m, as "m" is increased, the acceleration is decreased, resulting in less motion of the body as a result of shock and vibration forces "F".

Figure 9:
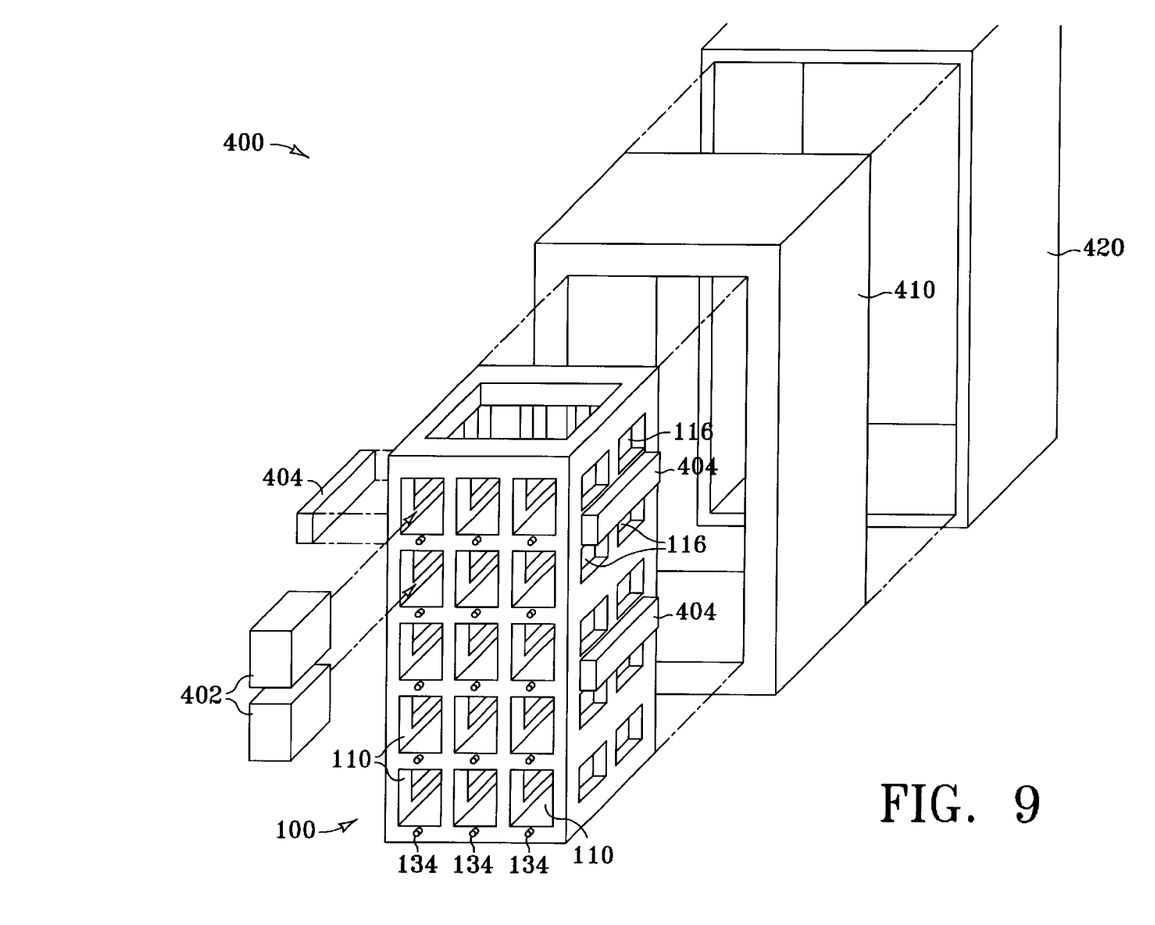
FIG. 9 depicts an isometric exploded view of a disk array system showing how the cage of FIG. 4 can be assembled into the disk array system.

Turning to FIG. 9, an exploded isometric view of a disk array system 400 in accordance with the present invention is depicted. The disk array 400 supports a plurality of disk drives 402. The disk drives are secured in a cage 100, which defines a plurality of openings 110 for receiving the disk drives 402. The disk drives are individually secured in a rigid manner into the openings 110 in the cage 100 by a locking system 134. The cage 100 can then be placed into a cage support structure 410, and the cage support structure can then be enclosed by an external enclosure 420. A compliant material, such as viscoelastic foam pieces 404, can be positioned between the cage 100 and the cage support structure 420 to allow forces external to the cage 100 to be attenuated.

Figure 4:
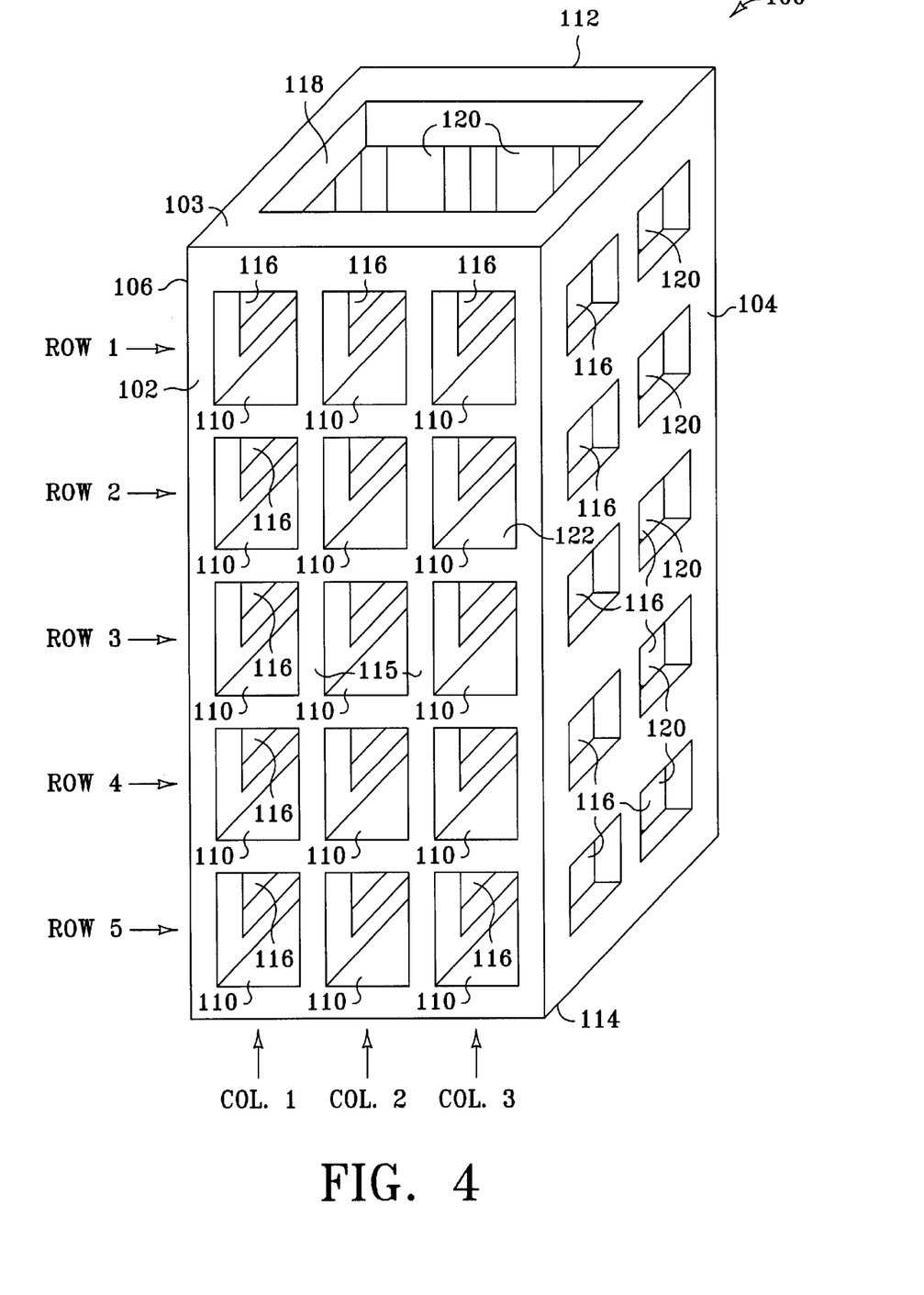
FIG. 4 depicts an oblique view of a cage for supporting a plurality of disk drives in accordance with a first embodiment of the present invention.

Turning to FIG. 4, the cage 100 of FIG. 9 is depicted in an oblique view. The disk drives are not shown in this figure, but are depicted in FIG. 9 as disk drives 402. The cage 100 of FIG. 4 can be fabricated by a number of different methods, including by metal casting. Although the cage 100 can also be formed from a polymeric material such as polycarbonate, preferably the cage is fabricated from metal to thereby increase the effective inertial mass of each disk drive supported in the cage. The cage 100 defines 5 rows (Row 1 through Row 5) of openings 110 defined in the front 102 of the cage, and each of the openings is configured to receive an individual disk drive therein. In one variation the openings 110 can be sized to receive more than one disk drive. Preferably the openings 110 are defined in columns (Col. 1, Col. 2 and Col. 3) such that the cage defines a matrix of openings 110. Preferably, the cage defines openings 116 in the sides 104 and 106 of the cage, as well as between the walls 115 which separate the openings 110, to allow cooling air to circulate between the disk drives. Likewise, the cage 100 can define an opening 118 in the top 108 of the cage to facilitate the flow of cooling air among disk drives supported in the cage. Although not depicted, openings can also be formed in the bottom 114 of the cage 100. In a similar manner, the cage 100 preferably defines openings 120 in the back 112 of the cage 100. In addition to allowing cooling air to circulate around disk drives supported in the cage 100, the rear openings 120 can be used to allow disk drives supported in the cage to connect to a back-plane or a mid-plane (such as mid-plane 30 of FIG. 2) for electrical power and data transfer.

Figure 5:
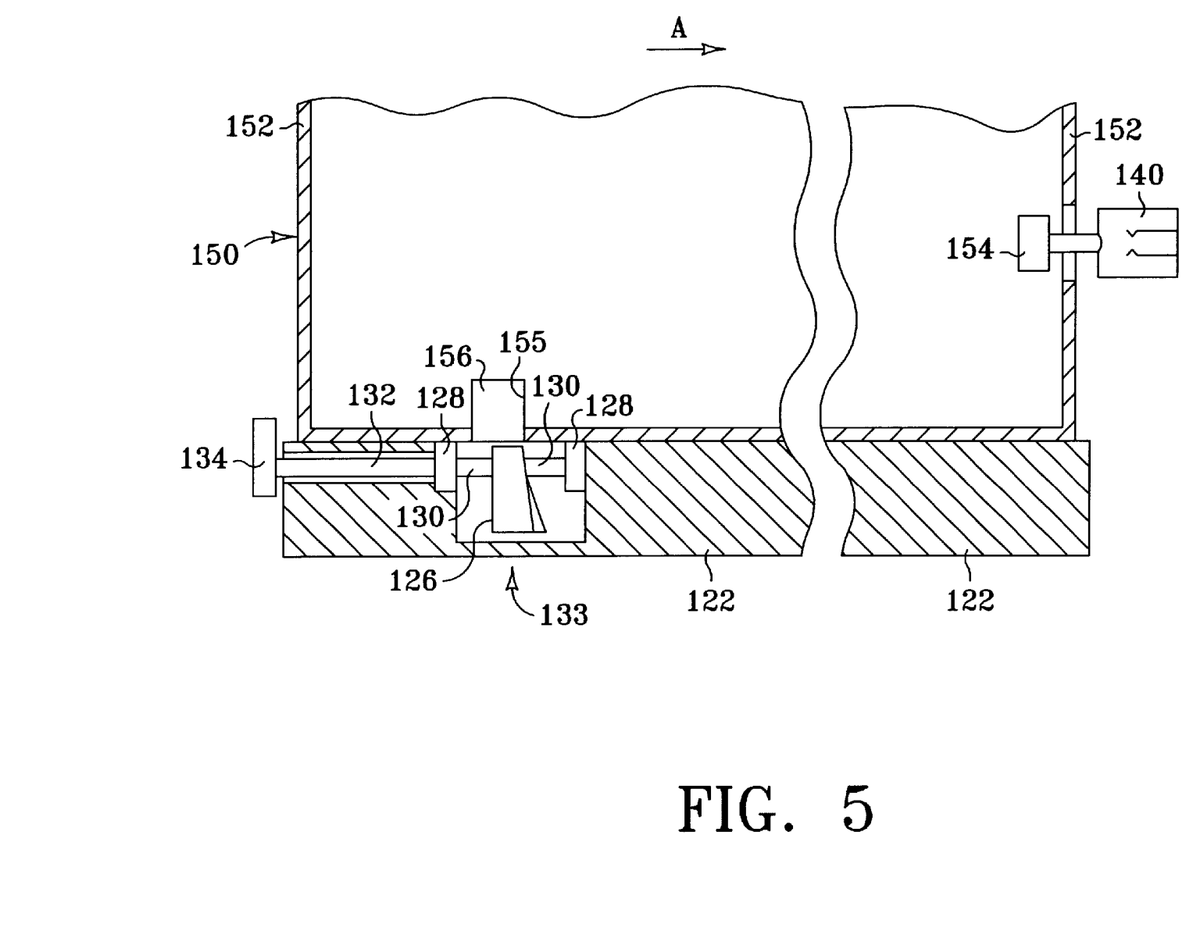
FIG. 5 depicts a partial side elevation sectional view of the cage of FIG. 4 showing how a disk drive can be secured within the cage.

The cage 100 also includes a locking system configured to secure the disk drives in the openings 110 a rigid manner. The locking system is not shown in FIG. 4 for simplicity, and is partly shown in FIG. 9 by locking system actuators 134. However, FIG. 5, which comprises a partial side elevation sectional view of the cage 100 of FIGS. 4 and 9, depicts one locking system, which can be used with the cage 100 of the present invention. FIG. 5 depicts a partial section of a disk drive 150, which is supported by a horizontal member 122 of the cage 100 (see also FIG. 4). The disk drive 150 includes a housing 152, and a connector 154 for connecting with a mating connector 140 which can be supported by a back-plane or a mid-plane (such as mid-plane 30 of FIG. 2) for electrical power and data transfer. The disk drive is inserted into the cage in the direction of arrow "A". The housing 152 of the disk drive 150 can define an open notch 156 having a back wall 155. The horizontal member 122 of the cage can be provided with a locking system 133, which comprises a rotatable cam 126 supported by a shaft 130 and bearings 128 in the horizontal member 122. The shaft 130 is connected to an actuator shaft 132, which is in turn connected to a locking system actuator 134, which can be a knob or a lever. By rotating the actuator 134, the cam 126 rotates up and into the notch 156 defined in the disk drive housing 152. The cam 126 will contact the back wall 155 defined by the notch 156, thereby forcing the disk drive 150 into a secure, rigid connection with the cage, and the connector 154 into contact with the mating connector 140. Preferably, the widest portion of the cam 126 is larger than the width of the notch 156, thereby limiting movement of the disk drive in the direction of arrow "A", and in the opposite direction, so that the disk drive is rigidly secured in the opening (110 of FIG. 4) of the cage 100 (FIG. 4).

It will be appreciated that, although not shown, other types of locking systems can be used to rigidly secure disk drives into the openings 110 of the cage 100 of FIGS. 4 and 9. For example, a disk drive can be provided with a latch, which secures the disk drive to the cage, much in the manner that similar prior art latches secure disk drives to chassis. Alternately, rather than mount the latch on the disk drive, the latch can be mounted on the cage. In another example the locking system can comprise a member, such as a metal bar or a plate, which is connected to the disk drive and the cage to thereby rigidly secure the disk drive to the cage, and consequently to other disk drives in the cage. In yet another example set screws mounted in the cage can be extended to press against the sides of the disk drive after the disk drive has been inserted into the opening in the cage. The openings in the cage for the disk drives can also be dimensioned such that when the disk drive is inserted into the opening, an interference fit is formed between the disk drive and the opening, such that a "locking system" is created between the cage and the disk drive. In this instance the disk drive can be removed from the opening by using a jacking system located at the back of the cage to push the disk drive from the opening. Alternately, the disk drive can be pulled from the front of the opening with an extractor, similar to a gear puller or the like, or by pulling on a handle attached to the front of the disk drive. Preferably, the interference fit, and the means used to extract the disk drive, are configured so as to avoid exerting excessive forces on the disk drive mounting case, which might damage the disk drive. For example, a handle used to extract the disk drive from the array can be attached to structural strength members incorporated into the disk drive. Preferably, the locking system allows the disk drive to be unconnected from the cage without undue effort to allow the disk drive to be removed for service or replacement.

Figure 6:
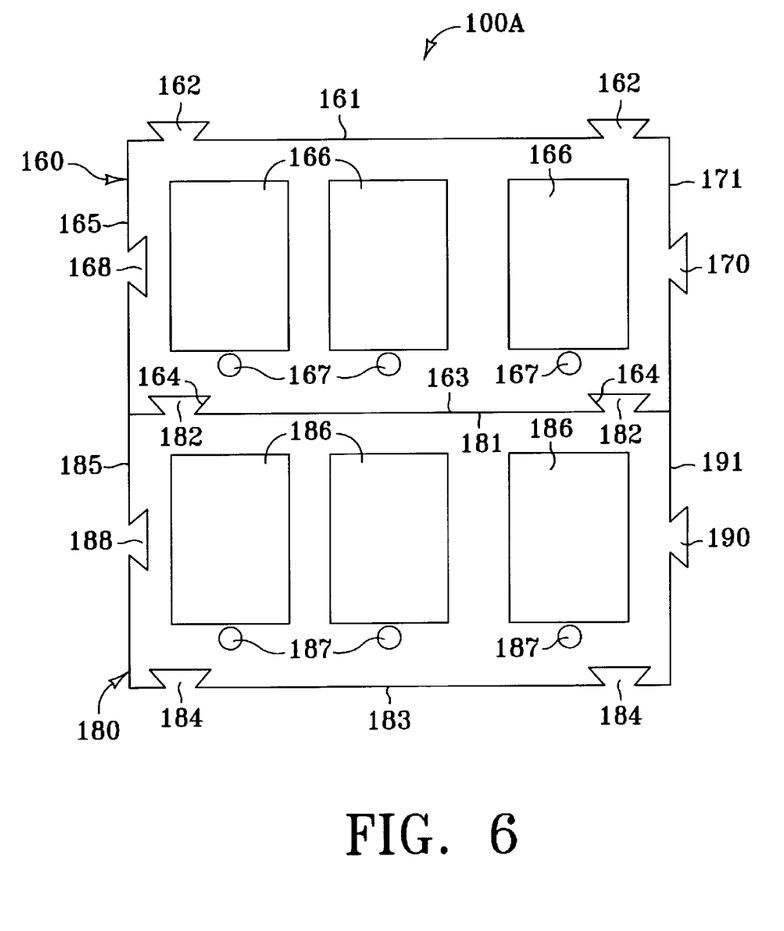
FIG. 6 depicts a front elevation view of two interconnectable cage components that can be used to form a cage for supporting disk drives in a disk array system, in accordance with the present invention.

In one variation on the embodiment of the invention depicted in FIGS. 4 and 9, rather than use a single, monolithic cage which has a sufficient number of openings to house all of the disk drives in the disk array, the cage can be built-up from smaller, modular cage units. Such a configuration allows a user to configure the disk array to include only as many cage units as are required to hold all of the disk drives intended for the disk array. This configuration also allows a user to configure the position of the disk drives in the disk array to accommodate other components within the system, such as control units, power supply units and cooling units, which the user may want to add to the disk array system. Turning to FIG. 6, a front elevation view of a cage assembly 100A is depicted. The cage assembly 100A comprises a first cage 160 and a second cage 180. The first cage 160 defines a plurality of first openings 166 each configured to receive a disk drive therein, and the second cage 180 defines a plurality of second openings 186 each configured to receive a disk drive therein. The first cage 160 is provided with a first locking system 167 for rigidly securing disk drives into the first openings 166, and the second cage 180 is provided with a second locking system 187 for rigidly securing disk drives into the second openings 186. The locking systems 167 and 187 can be any of the locking systems described above.

The cage units 160 and 180 are rigidly secured to one another. This can be done by any intrusive joining means, such as by welding, brazing or the like. However, preferably the cage units are configured such that they can be connected and disconnected from one another to provide the intended flexibility provided by using a modular cage system. One example of how modular cage units can be joined is depicted in FIG. 6. The first cage unit 160 and the second cage unit 180 each define tongue-and-groove connectors thereon which are used to connect the cages to one another. Specifically, cage unit 160 has top tongue connectors 162 formed on the top 161 of the cage unit, bottom groove connectors 164 formed on the bottom 163 of the cage unit, a side groove connector 168 formed on the left side 165 of the unit 160, and a side tongue connector 170 formed on the right side 171 of the unit. Similarly, cage unit 180 has top tongue connectors 182 formed on the top 181 of the cage unit, bottom groove connectors 184 formed on the bottom 183 of the cage unit, a side groove connector 188 formed on the left side 185 of the unit 180, and a side tongue connector 190 formed on the right 191 side of the unit. The tongue-and-groove connectors are configured to matingly connect to one another in an interference fit manner. As can be seen, the arrangement of top, bottom and side tongue-and-groove connectors allows additional cage module units to be added to the cage assembly 100A in any of four directions. In addition to the tongue-and-groove configuration described above and depicted in FIG. 6, a three-part tongue-and-groove connector can be used to connect the two cages 160 and 180 to one another. Such a tongue-and-groove connector is described below with respect to FIG. 7A, which shows how two disk drives can be rigidly connected to one another using such a connector. Other methods of rigidly connecting the cage units can also be used. For example, a separate cage unit securing member, such as a metal bar or the like, can be attached to two or more cage units to link them together. The cage unit securing member can be connected to the cage units for example by using screws or other fasteners.

Figure 10:
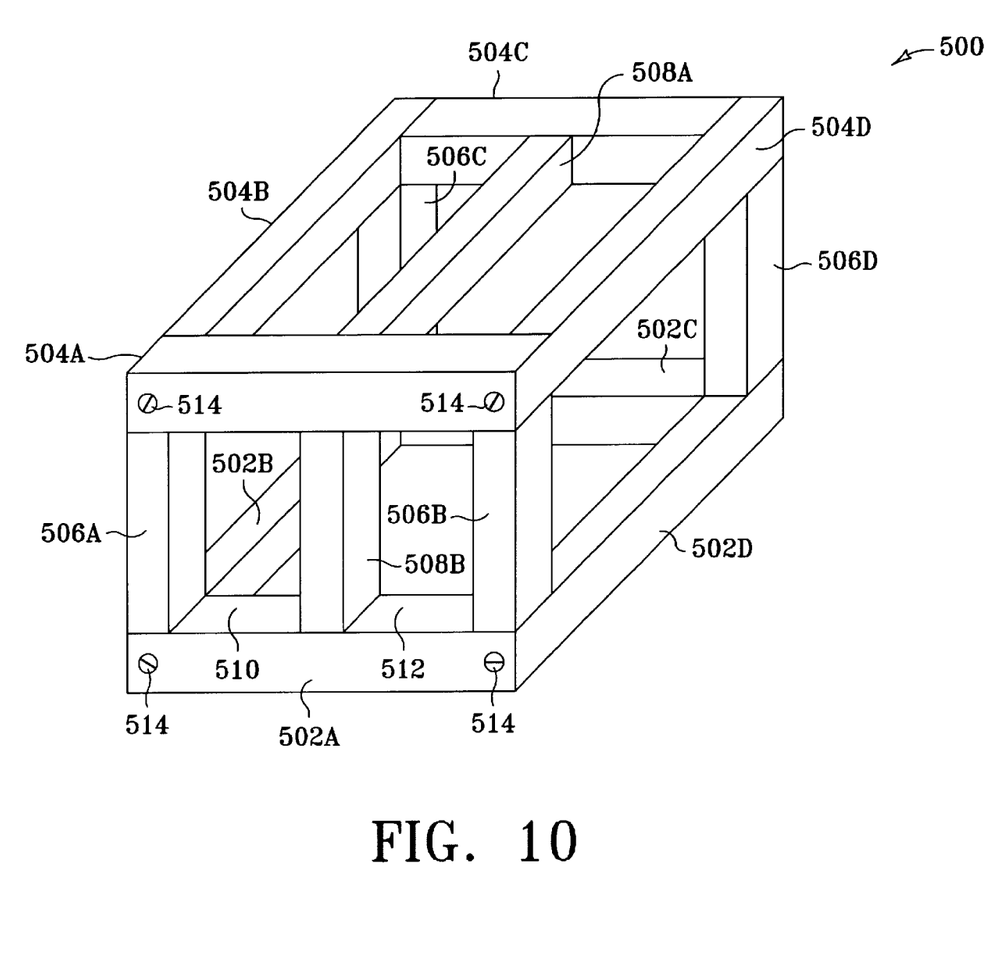
FIG. 10 depicts an oblique view of an alternate cage configuration for supporting a plurality of disk drives in accordance with the first embodiment of the present invention

In another variation on the first embodiment of the present invention, rather than providing a cage or cage units, which are fabricated from a monolithic casting or molding, the cage can be built-up from individual components. Such a cage is depicted in FIG. 10. The cage 500 of FIG. 10 is built-up from top perimeter members 504A–D, corner side members 506A–D, and bottom perimeter members 502A–D. A top intermediate member 508A can be located between respective top members 504B and 504D, and a front intermediate member 508B can be located between respective front corner members 506A and 506B, to thereby define openings 510 and 512 into which disk drives can be received. The cage 500 can also be provided with a locking system in the same manner as described above with respect to cage 100 (FIG. 4) and cage units 160 and 180 (FIG. 6). The members 502A–D, 504A–D and 506A–D, which form the cage 200 of FIG. 10 can be joined by intrusive joining methods, such as welding or brazing. The members can also be joined using fasteners, such as screws 514.

As previously described, one of the benefits of rigidly supporting the disk drives in the cage member is to increase the effective inertial mass of each disk drive. This increase in effective inertial mass results not just from the collective mass of all such disk drives secured to the cage, but also by the mass of the cage itself. Accordingly, preferably the cage is fabricated from a material, such as metal, having a relatively high specific gravity. More preferably, the metal has a specific gravity of greater than 5, and most preferably a specific gravity of greater than 7. This can be accomplished by fabricating the cage from steel or iron. When the cage is a monolithic unit such as cage 100 of FIG. 4, or modularized units such as 160 and 180 of FIG. 6, the cage and cage units can be fabricated by metal casting techniques. When the cage is a built-up unit such as cage 500 of FIG. 10 then the cage members can be cast, forged or drawn from a metal such as iron or steel.

Figure 8:
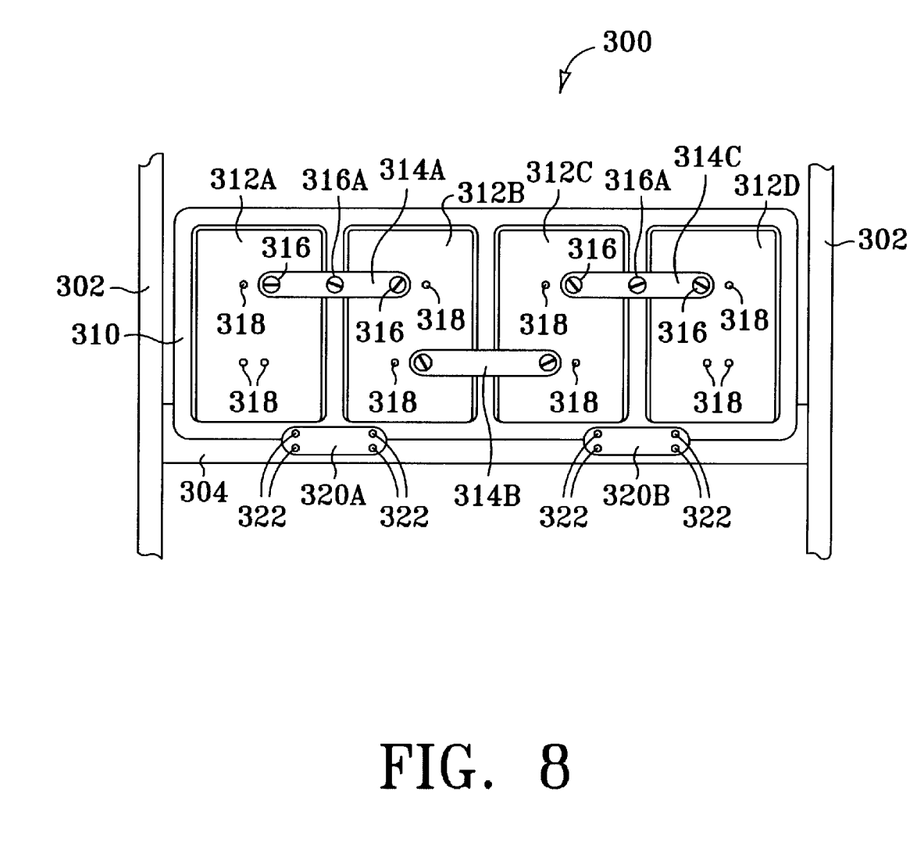
FIG. 8 depicts a front elevation view of a plurality of disk drives removably secured to one another in accordance with another embodiment of the present invention.

A second embodiment of the present invention provides for a disk array system comprising a plurality of disk drives rigidly connected to one another. The disk drives can be rigidly connected to one another using any of the cage structures described with respect to FIGS. 4, 5, 6, 9 and 10. The resulting disk array system can resemble the disk array system 400 depicted in FIG. 9 and described above. However, the disk drives in the disk array system do not need to be rigidly connected using a cage, and can be rigidly connected by other means. For example, the disk drives can be mounted in a chassis similar to the type of disk drive mounting chassis used in the prior art (see chassis 18 of FIG. 1), and then the disk drives rigidly connected to the chassis. Such a configuration is shown in FIG. 8, which depicts a front elevation view of a section of a disk array 300. The disk array includes disk drives 312A–D, which are mounted in chassis 310. Chassis 310 is itself supported by tray 304, which is part of frame 302. Frame 302 can be similar to prior art frame 14 of FIG. 1.

The disk array system 300 of FIG. 8 further includes a plurality of disk drive connecting members 314A, 314B and 314C. Each disk drive connecting member is rigidly connected to at least two disk drives to thereby rigidly connect the disk drives to one another in a rigid manner. For example, disk drive connecting member 314A rigidly connects disk drives 312A and 312B, disk drive connecting member 314B rigidly connects disk drives 312B and 312C, and so on, as shown by the drawing. Accordingly, disk drive 312A is held in relative rigid fashion with respect to disk drive 312C by virtue of disk drive connecting members 314A and 314B. Each disk drive connecting member can be rigidly connected to the disk drives by a variety of different means, but is preferably connected in a manner, which allows the disk drive connecting member to be removed with relative ease. This allows disk drives to be removed from the chassis 310 for servicing or replacement. For example, the disk drive connecting members can be rigidly connected to the disk drives using screws 316 or other threaded fasteners. A wing-nut type fastener can also be used so that a disk drive connecting member can be removed without the use of tools.

Further, the disk drives 312A–D in the disk array 300 can be configured such that the disk drives can be mounted in an inverted position yet still be connected by the disk drive connecting members 314A–C. For example, as depicted in FIG. 8, the disk drives 312A–D are each provided with additional threaded openings 318 which allow any one of the disk drives to be inverted in the chassis 310 yet still connected to an adjacent disk by a disk drive connecting member. The provision of the threaded openings also allows additional disk drive connecting members to be connected to the disk drives to provide additional rigidity between the disk drives. Further, although each disk drive connecting member 314A–C is depicted as rigidly connecting together only two disk drives, longer disk drive connecting members can be used to rigidly connect together more than two disk drives. However, this latter configuration makes removal of any one disk drive from the array more complicated than the configuration depicted in FIG. 8.

In addition to using the disk drive connecting members 314A–C to rigidly connect the disk drives 312A–D to one another, the disk drive connecting members can also be rigidly connected to the chassis. For example, disk drive connecting members 314A and 314B can be rigidly connected to chassis 310 by using fasteners 316A. This has two benefits. First, it provides additional structural rigidity for the disk drives, which are connected to the chassis 310, and secondly it ties the chassis into the rigidly connected gang of disk drives, thereby increasing the effective inertial mass of the disk drives. In a similar manner, the chassis can be rigidly connected to the frame 302 at the tray 304 using chassis connecting members 320A and 320B. The chassis connecting members can be connected to the chassis and frame using fasteners 322, which can be threaded fasteners, for example. In this way not only is the chassis 310 tied in more rigidly to the frame, thereby providing additional rigidity for the disk drives 312A–D, but the effective inertial mass of the disk drives becomes increased by the inertial mass of the frame 302.

Figure 7:
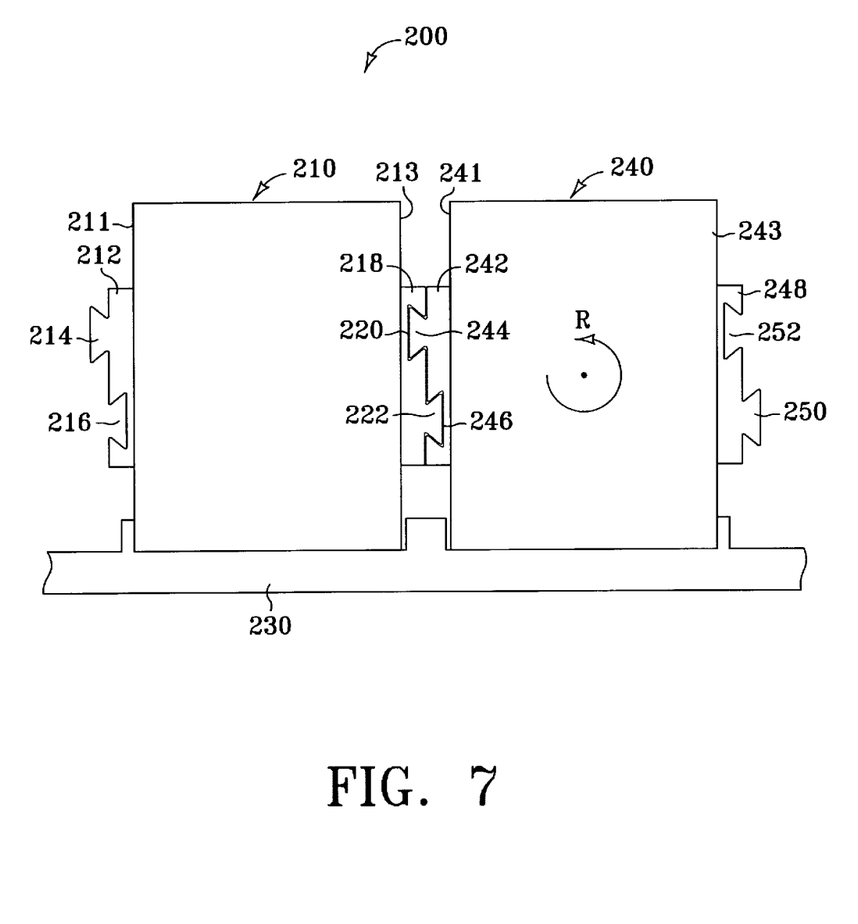
FIG. 7 depicts a front elevation view of two disk drives removably secured to one another in accordance with a second embodiment of the present invention.

In another variation on the second embodiment of the present invention the disk drives in a disk array can be rigidly connected to one another by directly connecting the disk drives to one another. Two or more disk drives can be directly rigidly connected to one another by a number of different methods, for example, by using screws, or welding, soldering, gluing, clamping, or by other means. However, preferably the rigidly connected disk drives are directly connected to one another in a manner which allows the disk drives to be disconnected with relative ease, that is, without the use of special tools or the like, so that individual disk drives can be removed from the array for servicing or replacement. One example of how this can be done is shown in FIG. 7, which depicts a front elevation view of a portion of a disk array system 200 having a first disk drive 210 and a second disk drive 240. The disk array system 200 can include additional disk drives, but only two disk drives are depicted in FIG. 7. The disk drives 210 and 240 are supported by a chassis 230, which can itself be supported by a frame (not shown) and located within an enclosure (not shown). Disk drive 210 is connected to disk drive 240 by a tongue-and groove connection, much in the same manner that the cage units 160 and 180 of FIG. 6 are connected to one another. More specifically, disk drive 210 includes a first tongue-and-groove connector 218, which defines a tongue element 222 and a groove element 220. Likewise, disk drive 240 includes a first tongue-and-groove connector 242, which defines a tongue element 244 and a groove element 246. The tongue element 222 of the first disk drive connector 218 is connected to the groove element 246 of the second disk drive connector 242, and the tongue element 244 of the second disk drive connector 242 is connected to the groove element 220 of the first disk drive connector 218. Preferably, the tongue elements 222, 244 and the groove elements 220, 246 form an interference fit there between to thereby rigidly connect the disk drives 210 and 240 to one another. The tongue-and-groove connection between the disk drives 210 and 240 can be separated by pulling or pushing one of the disk drives away from the other disk drive (i.e., into or out of the plane of the sheet on which the figure is drawn).

As seen in FIG. 7, disk drive 210 can be provided with a second tongue-and groove connector 212 defining a tongue element 214 and a groove element 216, and disk drive 240 can be provided with a second tongue-and groove connector 248 defining a tongue element 250 and a groove element 252. In this way another disk drive also having a compatible tongue-and-groove connector can be rigidly connected to the left side of disk drive 210, or to the right side of disk drive 240. The provision of the second tongue-and-groove connectors 212 and 248, and the configuration of the connectors 212, 218, 242 and 248, also allows one of the disk drives 210 or 240 to be inverted with respect to the other disk drive, yet still be rigidly connected to the other disk drive. For example, disk drive 240 can be disconnected from disk drive 210, rotated 180 degrees in the direction indicated by arrow "R", and reconnected to disk drive 210. This may be desirable when it is determined that the orientation of the two disk drives 210 and 240 with respect to one results in a resonant vibration due to the inherent self-excitation of each disk drive. By inverting one of the disk drives the self-excitation forces will tend to cancel out the resulting vibration, rather than producing a resonant vibration.

Figure 7A:
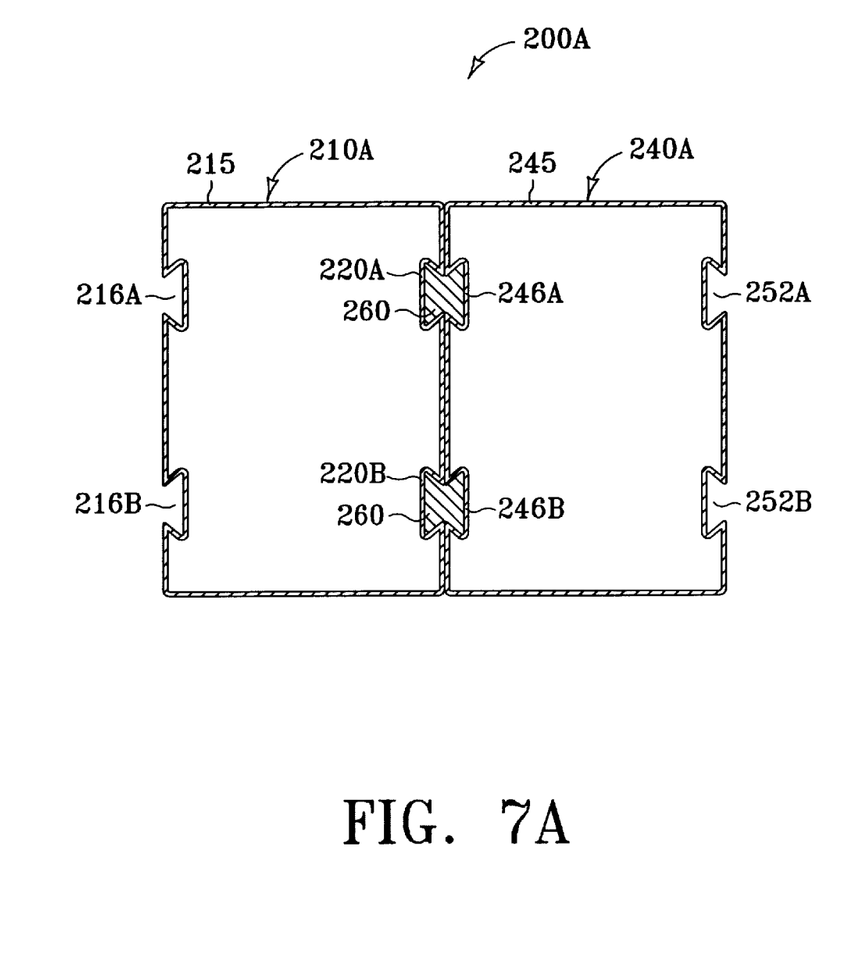
FIG. 7A depicts a front elevation sectional view of two disk drives removably secured to one another in accordance with a variation on the embodiment of the present invention depicted in FIG. 7.

A variation on the embodiment depicted in FIG. 7 is shown in FIG. 7A, which shows how two disk drives can be rigidly connected to one another using a three-part tongue and groove connection. FIG. 7A depicts a front elevation sectional view of disk drives 210A and 240A which are part of a disk array system 200A. Disk drive 210A has first groove elements 216A, 216B, 220A and 220B formed in the disk drive case 215. In like manner, disk drive 240A has second groove elements 246A, 246B, 252A and 252B formed in the disk drive case 245. Groove elements 220A and 220B are placed juxtaposed to respective groove elements 246A and 246B. The two disk drives 210A and 240B are then jointed by inserting tongue elements 260 into the channels formed by the adjacent grooves. The outside groove elements (216A, 216B, 252A and 252B) allow additional disk drive to be connected using additional tongue elements, and also allow the disk drives to be rotated or inverted in the manner described above with respect to FIG. 7.

A third embodiment of the present invention provides for a method of supporting a plurality of disk drives in a disk array system. The method includes the steps of providing a first disk drive and a second disk drive, rigidly connecting the first disk drive to the second disk drive, and mounting the rigidly connected disk drives into the disk array system. The result is that the effective inertial mass of each disk drive in the array, which is connected in this manner is increased, thereby reducing the vibrational response of each disk drive to external forces as well as internal self-excitation forces. Additionally, when the disk drives are rigidly connected in this manner the self-excitation forces from one disk drive can have an attenuating effect on the self excitation forces of the other disk drives. When several disk drives are rigidly connected and mounted in a disk array in this manner the resultant effect of the self-excitation forces tends to be near zero. That is, if the self-excitation forces of each disk drive tend to average in magnitude from a value of −10 (regardless of units) to +10 (which is the typical scenario since self excitation typically results from the periodic rotation of the disks in a disk drive, and from the random movements of read/write heads inside the disk drives), and since the self-excitation forces are randomly distributed in time, then the average will be near zero.

The disk drives can be rigidly connected to one another in any of the manners described above with respect to FIGS. 4–10. For example, the disk drives can be rigidly connected to one another by directly connecting the disk drives, as depicted in FIG. 7. Alternately, the method can include the step of providing a disk drive securing member, and rigidly connecting the disk drives using the disk drive securing member. For example, the cages depicted in FIGS. 4, 5, 6, 9 and 10 can be considered as "securing members" since the cages are provided with a locking system to secure the disk drives into the cages in a rigid manner. Also, the disk drive securing members 314A–C of FIG. 8 can be used as the securing members to rigidly connect the disk drives.

As mentioned above, each of the disk drives in the disk array are typically characterized by a respective self-excitation force when the disk drive is in operation. Each self-excitation force produces a characteristic frequency, resulting in a characteristic vibration pattern for each disk drive. The vibration patterns, which result from periodic self-excitation forces (typically induced by the spinning of the disk within the disk drive) are typically sinusoidal in nature, while the random self-excitation forces (typically induced by the movement of the read/write arm and head) are typically random in nature. Although the amplitude and frequency of each self-excitation forces may be similar, typically the period of the sinusoidal vibration pattern of each disk drive will be shifted in time relative to the period of vibration patterns of the other disk drives. However, it may occur that the characteristic vibration pattern of one disk drive coincides in time with the characteristic vibration pattern of the other disk drive, resulting in a harmonic vibration pattern. When this occurs, the method can further include the step of inverting one of the disk drives before connecting it to the other disk drive to thereby allow the characteristic vibration pattern of each disk drive to attenuate the characteristic vibration pattern of the other disk drive. Inverting the disk drive also places the disk drive read-write arm in a different position than in a non-invented disk drive. Depending on where the read-write arm is positioned within the disk drive, inverting the disk drive can orient the arm on the opposite side, and/or in a different top/bottom orientation, than in a non-inverted disk drive. Since a significant portion of self-excitation forces are generated by movement of the read-write arms, this repositioning of the read-write arm by inverting the disk drive can contribute to attenuation of the forces resulting from movement of the read-write arms. When the disk drives are configured such that they can be inverted about a vertical axis (i.e., rotated end-for-end), then the disk drives can also be inverted in this manner to aid in achieving attenuation of self-excitation forces. However, this latter variation requires that the disk drive still be capable of being connected to the system after being inverted, either by having connectors on both ends, or by using a flexible connector cable, or by using wireless connections.

The method can further include the steps of determining the characteristic frequency of a first one of the disk drives and determining a characteristic frequency of a second one of the disk drives. Then, prior to rigidly connecting the first disk drive to the second disk drive, the first and second disk drives are oriented with respect to one another such that their characteristic frequencies tend to have an attenuating effect on one another. This can be accomplished for example by using the tongue-and-groove connector system depicted in FIG. 7, or the reversible mounting arrangement depicted in FIG. 8.

As described previously, by increasing the effective inertial mass of each disk drive in the disk array, the effects of shock and vibration on each disk drive will be attenuated. By rigidly connecting the disk drives the effective inertial mass of each disk drive effectively becomes the collective inertial mass of all of the rigidly connected disk drives. The method can further include the step of securing the disk drives to a support component within the disk array system to thereby further increase the collective inertial mass of the disk drives. This can be done for example by using a cage system as depicted in FIG. 9, or by connecting the disk drives to a prior-art support component, such as to chassis 310 and frame 302, as depicted in FIG. 8. Alternately, or in addition to securing the disk drives to a support component in the disk array system, the method can further include the step of rigidly securing an additional mass to each of the disk drives to thereby increase the collective inertial mass of the disk drives. This can be done by adding mass, such as a metal plate or the like, either externally to or internally to the disk drive. Preferably, the mass is rigidly secured to the disk drive.

While the above invention has been described in language more or less specific as to structural and methodical features, it is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. An apparatus for supporting a plurality of disk drives in a disk array system, comprising:
    a cage configured to be received within an enclosure;
    a plurality of disk drives rigidly connected to one another, and wherein the plurality of disk drives are rigidly mounted in the cage; and
    wherein the cage defines a plurality of openings in which the plurality of disk drives are individually received therein, and further wherein the openings are aligned as rows of openings and columns of openings forming a matrix of openings.

2. The apparatus of claim 1, and further wherein the cage comprises a metal casting.

3. The apparatus of claim 1, and further wherein the cage comprises a plurality of metal members joined together by at least one of welding, brazing, or fastening.

4. The apparatus of claim 1, and further wherein the cage comprises a metal having a specific gravity greater than 5.

5. The apparatus of claim 3, and further wherein each metal member comprises at least one of a cast member, a forged member, or an extruded member.

6. An apparatus for supporting a plurality of disk drives in a disk array system, comprising:
    a cage defining a plurality of openings, the cage configured to be received within an enclosure;
    a plurality of disk drives rigidly connected to one another, and wherein the plurality of disk drives are rigidly mounted in the cage; and
    a locking system configured to secure individual disk drives into the openings in the cage in a rigid manner.

7. The apparatus of claim 6, and further wherein the locking system comprises a cam rotatably supported within the cage and configured to engage a surface on the disk drive to thereby urge the disk drive into a secure position within an opening in the cage.

8. The apparatus of claim 6, and further wherein the cage defines a first cage defining a first plurality of openings configured to selected ones of the plurality of disk drives individually therein, and the locking system is a first locking system, the apparatus further comprising:
    a second cage rigidly connected to the first cage, the second cage defining a second plurality of openings configured to receive selected ones of the plurality of disk drives individually therein, the second cage comprising a second locking system for securing individual disk drives into the second plurality of openings.

9. The apparatus of claim 7, and further wherein:
    the cage defines a plurality of openings in which the plurality of disk drives are individually received therein along a first direction; and
    the locking device is configured to rigidly secure each disk drive inserted into an opening in the cage such that the disk drive is constrained to move within the opening, and with respect to the surrounding cage, in directions orthogonal to the first direction, and by not more than about 100 microns when subjected to a force of not more than about 10 kg.

10. The apparatus of claim 8 and wherein the first cage and the second cage each define tongue-and-groove connectors thereon, the tongue-and-groove connectors configured to matingly connect to one another in an interference fit manner, and wherein the first cage and the second cage are connected by the tongue-and-groove connectors.

11. The apparatus of claim 9, and wherein the first cage and the second cage each define groove elements of a tongue-and-groove connector, the groove elements configured to align juxtaposed to one another and to be joined by a tongue element to thereby connect the first cage to the second cage.

12. A disk array system comprising:
    a plurality of disk drives rigidly connected to one another;
    a chassis configured to support the plurality of disk drives;
    a frame configured to support the chassis;
    a disk drive connecting member rigidly connected to the plurality of disk drives to thereby rigidly connect the disk drives to one another; and
    wherein the disk drives are rigidly secured to the chassis, and the chassis is rigidly secured to the frame.

13. The disk array system of claim 12, and further comprising a chassis connecting member rigidly connected to the chassis and the frame.

14. A disk array system comprising:
    a plurality of disk drives rigidly connected to one another;
    a chassis configured to support the plurality of disk drives;
    a frame configured to support the chassis; and wherein:
        at least a first one of the disk drives defines a tongue element of a tongue-and-groove connector;
        at least a second one of the disk drives defines a groove element of a tongue-and-groove connector; and
        wherein the tongue element of the first one of the disk drives is connected to the groove element of the second one of the disk drives to form a tongue-and-groove connection between the disk drives, and wherein the tongue element and the groove element form an interference fit there between to thereby rigidly connect the disk drives to one another.

15. A disk array system comprising:
    a plurality of disk drives rigidly connected to one another;
    a chassis configured to support the plurality of disk drives;
    a frame configured to support the chassis; and wherein
        at least a first one of the disk drives defines a first groove element of a tongue-and-groove connector;
        at least a second one of the disk drives defines a second groove element of a tongue-and-groove connector; and
        further comprising a tongue element; and
        wherein the first groove element and the second groove element are positioned juxtaposed to one another, the tongue element is inserted into the juxtaposed groove elements, and the tongue element and the groove elements form an interference fit there between to thereby rigidly connect the disk drives to one another.

16. A method of supporting a plurality of disk drives in a disk array system, comprising:
    providing a first disk drive;
    providing a second disk drive;
    rigidly connecting the first disk drive to the second disk drive;
    mounting the rigidly connected disk drives into the disk array system; and
    wherein a first and a second of the disk drives are each characterized by a self-excitation force when in operation, each of the self excitation forces producing a characteristic frequency resulting in a characteristic vibration pattern for each disk drive, the method further comprising inverting one of the disk drives before connecting it to the other disk drive to thereby allow the characteristic vibration pattern of each disk drive to attenuate the characteristic vibration pattern of the other disk drive.

17. The method of claim 16 and wherein a first and a second of the disk drives are each characterized by a self-excitation force when in operation, each of the self excitation forces producing a characteristic frequency resulting in a characteristic vibration pattern for each disk drive, the method further comprising:

determining the characteristic frequency of a first one of the disk drives;

determining a characteristic frequency of a second one of the disk drives; and prior to rigidly connecting the first disk drive to the second disk drive, orienting the first and second disk drives with respect to one another such that their characteristic frequencies tend to have an attenuating effect on one another.

18. The method of claim 16 and wherein the disk drives are defined by a collective inertial mass, the method further comprising rigidly securing the disk drives to support component within the disk array system to thereby increase the collective inertial mass of the disk drives.

19. The method of claim 16 and wherein the disk drives are defined by a collective inertial mass, the method further comprising rigidly securing an additional mass to each of the disk drives to thereby increase the collective inertial mass of the disk drives.

20. A method of supporting a plurality of disk drives in a disk array system, comprising:

providing a plurality of disk drives in a matrix, the matrix comprising a plurality of rows of the disk drives and a plurality of columns of the of the disk drives;

rigidly connecting the disk drives in each row to one another;

rigidly connecting the disk drives in each column to one another; and mounting the disk drives into the disk array system.

* * * * *